Figure 1:
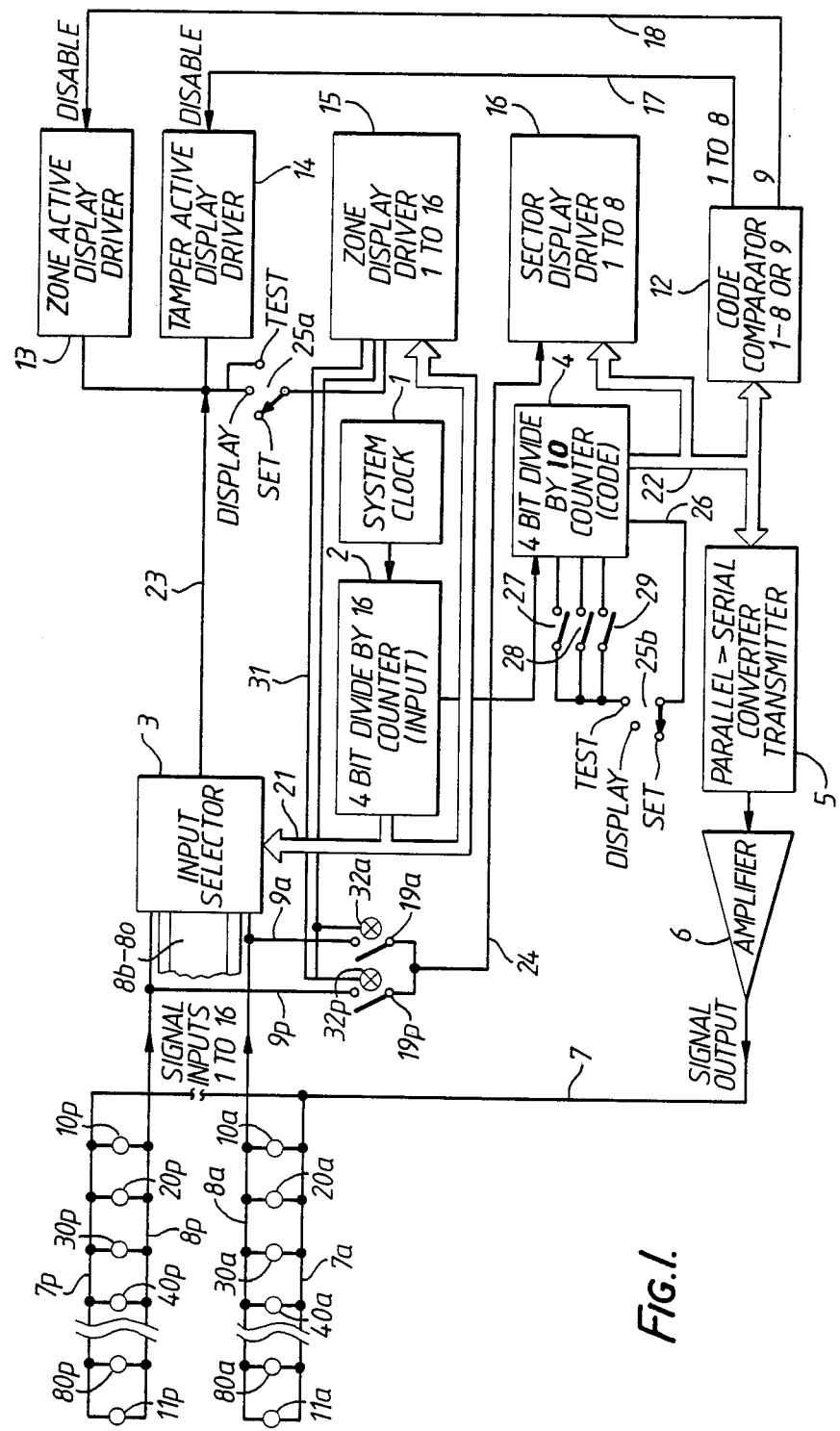

United States Patent [19]

Meehan et al.

[11] Patent Number: 4,862,145
[45] Date of Patent: Aug. 29, 1989

[54] PEST MONITORING SYSTEM

[75] Inventors: Adrian P. Meehan, Uckfild; Vernon R. Ash, Walter-on-Thames, both of England

[73] Assignee: Rentokil Limited, West Sussex, England

[21] Appl. No.: 159,664

[22] Filed: Feb. 24, 1988

[30] Foreign Application Priority Data

Feb. 25, 1987 [GB] United Kingdom ............ 8704375

[51] Int. Cl.$^4$ ............................................. G08B 26/00
[52] U.S. Cl. .................................................... 340/573
[58] Field of Search .......... 340/540, 561, 568, 573, 340/541, 573

[56] References Cited

U.S. PATENT DOCUMENTS

| | | | |
|---|---|---|---|
| 3,633,001 | 1/1972 | Vajnovszky | 340/561 X |
| 4,006,460 | 2/1977 | Hewitt et al. | 340/149 R |
| 4,068,105 | 1/1978 | Jain et al. | 179/175.3 R |
| 4,206,449 | 6/1980 | Galvin et al. | 340/505 |
| 4,342,985 | 8/1982 | Desjardins | 340/525 |
| 4,525,699 | 6/1985 | Buck et al. | 340/561 X |

FOREIGN PATENT DOCUMENTS

| | | |
|---|---|---|
| 10390913 | 4/1975 | United Kingdom . |
| 1592162 | 7/1981 | United Kingdom . |
| 2164475 | 3/1986 | United Kingdom . |
| 2039400 | 8/1986 | United Kingdom . |
| 2179481 | 3/1987 | United Kingdom . |

OTHER PUBLICATIONS

J. O. Bull, One Mouse, An Apprraisal of Remote Detection Methods in Food Premises, in the British Food Journal, Mar./Apr. 1975 (vol. 77, No. 865), pp. 51, 52 and 54.

Primary Examiner—Jerry W. Myracle
Attorney, Agent, or Firm—Merchant, Gould, Smith, Edell, Welter & Schmidt

[57] ABSTRACT

A pest monitoring apparatus includes a plurality of detectors distributed over an area under surveillance and each linked to an indicator for indicating whether or not anything has been detected by any one or more of the detectors. The indicator sends signals to each of the detectors and each detector responds only if it has detected a pest. Responders, as distinct from detectors, are included in the apparatus to permit the indicators to check on whether or not the links between the indicator and the detectors are intact.

19 Claims, 5 Drawing Sheets

PEST MONITORING SYSTEM

The present invention relates to apparatus for monitoring the activity of pests, particularly small rodents such as mice.

Established methods of dealing with mice as pests involve the use of bait, usually harmful to and intended to be taken by the animal, placed at several locations within premises, usually a building, where infestation is suspected or is occurring. Various aspects of pest control measures, including the selection of the locations at which bait is to be placed, and the consequent effectiveness of any baiting, depend largely on the experience of the pest control personnel conducting the operation as regards patterns of pest behaviour, and it may be expected that the pest control measures could be improved through say, the creation and use of records as to where bait has been put down and how much, if any, has been taken, for determining first of all whether or not pests are present, and, where they are found to be present, for indicating the extent and pattern of their activity.

The correct determination that pests are or are not present, and, where they are present, the efficiency of countermeasures based on the results of monitoring pest activity will be dependent on the accuracy of the monitoring. However, the overall efficiency of any operation in which an activity is monitored will depend not only on the accuracy of the results of the monitoring phase of the operation but also on the time and effort required to achieve a desired level of accuracy, so a balance must be struck between an acceptable level of accuracy and the time required to achieve it.

It is an object of the present invention to alleviate one or more of the problems that have arisen in connection with methods previously adopted for the control of pests such as mice.

It is a further object of the present invention to provide an apparatus suitable for monitoring pest activity, which provides information relating to the activity of the pest which is the target of the monitoring, more quickly than it is possible to obtain information on pest activity by the use of bait, and with substantially no loss in accuracy compared with the use of bait.

In accordance with the invention, apparatus for monitoring the activity of pests includes a plurality of detector means distributed over an area under surveillance, an indicating means for indicating whether or not a pest has been detected by any of the detector means and being capable of sending a signal to each detector means, the indicating means and each detector means being linked by transmission means, each detector means being capable of providing information to the indicating means as to whether or not a pest has been detected only on receipt of a signal from the indicating means, and, when the apparatus is in use for monitoring, responding to a said signal or making no response to the signal to indicate to the indicating means whether or not a pest has been detected by that detector means, and testing means capable of providing at the indicating means an indication as to whether or not there is a fault in the transmission means.

In a preferred arrangement, when the apparatus is in use for monitoring each detector means responds to a said signal from the indicating means when a pest has been detected by that detector means and makes no response when no pest has been detected. An alternative arrangement would be that, when the apparatus is in use for monitoring, each detector means responds to a said signal from the indicating means when no pest has been detected and makes no response when a pest has been detected by that detector means.

It will be appreciated that the above-described detector means are "passive" in that they provide information to the indicating means only when interrogated by the indicating means, that is, only in response to the receipt of an appropriate signal from the indicating means. Such detectors may be contrasted with "active" detectors which would provide information to the indicating means without being interrogated by the indicating means. Furthermore the detectors make use of the alternatives of response/no response to inform the indicating means whether or not a pest has been detected, rather than sending one response signal for "yes" and a different response signal for "no".

In a preferred arrangement, the indicating means is capable of sending a setting signal to each detector means to place each detector means in an activated state, the setting signal not being sent when the apparatus is in use for monitoring, each detector means responds to the indicating means in the event of receiving the setting signal, and the indicating means is capable of indicating from which of the detector means a response is received when the indicating means sends the setting signal. With this arrangement, the indicating means and the detector means may be used, as explained further below, to indicate the location of a fault in the transmission means.

Additionally, each of the detector means may include display means, for example, a lamp, for indicating when it is in an activated state as the result of detecting a pest or as a result of receiving a setting signal, to permit visual inspection of the state of each detector means either during monitoring or as a check on whether or not the setting signal is being received by the detector means under inspection.

In a preferred embodiment of the apparatus the testing means, when the apparatus is in use for monitoring, is incapable of detecting a pest.

Advantageously, when the apparatus is in use for monitoring, the testing means normally (in the absence of faults in the transmission means or, where there is more than one testing means (see below) in the part of the transmission means monitored by that testing means) sends signals to the indicating means, the failure of the indicating means to receive signals from the testing means being indicated as a fault. Preferably, the testing means sends a signal to the indicating means only on the receipt by the testing means of a specific signal, for example, a code specific to the testing means, from the indicating means.

In a preferred arrangement, the testing means occupies a position along the transmission means that is remote from the indicating means, and the detector means occupy positions between the testing means and the indicating means. With this arrangement, a fault at any point along the transmission means will prevent a signal from the testing means being received at the indicating means, and a fault will be indicated. The position of the fault on the transmission means may then be determined, with reference to the positions of the detector means, by the use of the indicating means to send the setting signal along the transmission means and checking on which of the detector means are activated by the setting signal.

In one embodiment of the invention, the apparatus includes at least one additional testing means and the indicating means is capable of indicating from which of the two or more testing means no signals have been received, in the event of there being a failure to respond. The first and the additional testing means are located in respective parts of the transmission means and the failure of a testing means to report to the indicating means is indicated as a fault in the respective part of the transmission means.

In accordance with the invention, the detection of a pest by one of the detector means will cause an indication that the pest has been detected to be received at the indicating means. The indicating means advantageously includes, for example, a warning light that is illuminated when the first pest is detected in a monitoring period, thus indicating that inspection of the apparatus is desirable. The indicating means preferably includes means for identifying to which group of detector means the detector that detected the pest belongs, the number of detector means in the group being smaller than the total number of detector means. Advantageously, the indicating means can indicate the detector means that has or have detected a pest.

Advantageously, the apparatus is capable of retaining information as to which of the detector means, or group of detector means, has or have detected a pest. The apparatus may, for example, be capable of retaining, for each detector means, only the information that the detector means has detected a pest, or additional information may be retained, for example, information that there has been detection of more than one pest by the detector and/or the time, or times, of detection.

Where the apparatus is capable of retaining information all of the information may, for example, be retained by the detector means which detects or detect a pest or pests, the information being available for display by the indicating means. Alternatively, information may be stored centrally, for example, in storage means associated with the indicating means, such stored information being displayed, or available for display, as required. If desired, the indicating means may comprise or be associated with recording means, for example, an event recorder, capable of recording information received at the indicating means regarding the detection of pests.

A detector means for use in accordance with the invention advantageously comprises one or more sensing devices housed in a enclosure or, in general terms, positioned in an environment that is relatively favored by the pests to be detected The provision of a relatively favored environment in association with the sensing device(s) may increase the likelihood of pests that are present in the location, for example, the building, in which the apparatus is installed, being detected by the apparatus. Where the sensing device(s) in or are housed in an enclosure the enclosure may, as explained below, be such as to minimise the chances of the apparatus responding to non-pest activity.

Where mice are to be detected a relatively favoured environment may be provided by means of a narrow channel, or other enclosure, for example a box, which enclosure is provided with holes through which the mice may enter or leave. We have observed that mice favour enclosed spaces, especially when these are small enough for the mice to contact opposed walls simultaneously. The use of enclosed spaces may also be advantageous in detecting other creatures having cryptic habits.

Where a narrow channel is used to provide the relatively favored environment the channel advantageously comprises one or more tubes running, for example, along the floor at the bottom of a wall, or up a wall, for example, in a corner. Such tubes are advantageously provided with holes at intervals along their length so that mice can enter the tubes. The tubes provide preferred runways for the mice. Sensing devices are so positioned that mice in the tubes can be detected. An advantageous enclosure is a small box provided with two holes through which a mouse can squeeze. In any tube or other enclosure the holes and a sensing device or sensing devices are advantageously so arranged that triggering of the sensing device or devices cannot be effected by a finger or other extraneous item inserted through the hole It will often be advantageous if the detector means are such that they are unlikely to detect bodies substantially larger or substantially smaller than the pests it is desired to detect For example, where the apparatus is to be used to detect the presence of mice it will normally be advantageous for the sensor means to be unlikely to respond to people on the one hand and insects on the other. In other circumstances, however, for example, if it is desired to detect the presence of all pests of or below a certain size, it will be advantageous for the detector means to be capable of detecting bodies of or below that size but incapable of detecting bodies substantially above that size. This may be achieved by, for example, situating a sensing device or sensing devices in an enclosure, for example, a box, or the like, which has appropriately sized entrances capable of excluding bodies above a certain size.

In one advantageous arrangement, each detector means comprises a sensing device housed in an enclosure that is so contoured internally as to favour the entry of pests conforming to selected physical characteristics of the pests which are the target of the monitoring. Further use may be made of the internal contouring of the enclosure to cause a pest moving in the enclosure to move into the detection field of the sensing device, in order to maximise the chances of detecting a pest which has entered the enclosure.

If desired, a plurality of sensing devices may be so positioned in an enclosure as to favour detection only of pests of particular sizes, which are the sizes of the pests which are the target of the monitoring. Further arrangements for improving the chances of detecting only the pests to be monitored include the use of a first line-of-sight sensing device capable of detecting pests only of heights within a selected range, and a second line-of-sight sensing device capable of detecting pests only of widths within a selected range, where the selected ranges are characteristic of the pests that are the target of the monitoring. Additionally, the enclosure may be so contoured internally as to cause a pest to pass with a specific orientation within the detection field of the sensing device or the sensing devices. In general, the sensing devices and the enclosures are preferably designed to maximize the chances of detecting the pest that is the target of the monitoring and to minimize the chances of the detectors responding to non-pest activity or to the activity of pest other than those being monitored In the apparatus of the invention each detector means, or group of detector means, advantageously has identifying means, which may represent a binary word or code, so that it is possible to identify the places where pests have been detected This may be of particular advantage when the apparatus is used in very large premises The detector means may include means for recognising an identifying signal, for example, a code comparator arranged to respond to an identifying code.

In one arrangement, each of the detector means is arranged once triggered to remain in an activated state in which it indicates the detection of a pest until reset by operator intervention. In an alternative arrangement, the detector means is arranged, when triggered, to indicate the detection of a pest for a set period during which the event is recorded, and then to cease to so indicate, and to repeat the cycle indefinitely.

Preferably, the indicating means is arranged to interrogate each of the detector means and the means for testing.

Preferably, each of the detector means includes storage means which holds an identity code for the detector means, each detector means having its own identity code, the indicating means is arranged to interrogate the detector means by sending the identity codes of all the detector means, and each detector means is arranged to respond to the control means only when in the activated state and on receiving the identity code held by its storage means, and is arranged to recognise and respond to a reset code for setting the detector means to the inactive state.

The detector means may comprise any suitable sensing device Suitable sensing devices include, for example, those responsive to changes in pressure, temperature, smell, sound (including ultrasound), and/or capacitance in the vicinity of the sensing device. Transducers, especially pressure transducers may be used. Other suitable sensing devices are a microswitch which is activated when a mouse or other pest pushes past a wire, or any other device that is capable of responding when the pest brushes against it. Preferred sensing devices are those in which the pest interrupts a light beam, for example an infra-red beam. If desired such a beam may be deflected round corners using mirrors or light guides or pipes, and/or the beam could be positioned so that it is too high to be interrupted by, for example, a small insect crawling over the floor but sufficiently low to be interrupted by, for example, a mouse.

In any given apparatus the detector means must of course be chosen having regard to the pests to be detected and the location in which the sensor means are to be installed. The detector means should as far as possible be free from the risk of responding to extraneous events, for example, vibrations due to the operation of machinery nearby. The system may be such that the detecting devices merely sense the presence of the pests and the pests are unaffected by the system, or there may be arrangements in which the system responds to the detecting devices in a way which affects the pest, for example by trapping it.

In one arrangement, the transmission means is a transmission line which may be realised in any one of several possible forms Thus, for example, the parts of the apparatus may be linked by the main electricity supply conductors, provided that account is taken of the fluctuations that can occur in the mains voltage and action is taken to prevent spurious responses occurring as a result of them.

Linking of the parts of the apparatus by the transmission means may involve the use of a radio transmitter associated with each detector means and one or more radio receivers, there being, preferably, a common receiver for all the transmitters, the common receiver being in the vicinity of the indicating means. One advantage of the use of radio transmission is that the detector means can readily be moved from one location to another. Due regard must be had, however, to the surroundings in which the transmitter is to be used so that, for example, interference can be eliminated or reduced and so that the operation of surrounding equipment is not adversely affected.

The transmission of the signals may involve the use of infra-red light. Thus, for example, each detector means could be provided with means for transmitting infra-red light, there being one or more receivers for the infra-red light. If desired a common receiver could be used for two or more of the detector means. Ultrasound transmitters and receivers may also be used.

An alternative generalized form of apparatus in accordance with the invention for monitoring the activity of pests includes a plurality of detector means distributed over an area under surveillance, an indicating means for indicating whether or not a pest has been detected by any of the detector means, the indicating means and each detector means being linked by transmission means, and testing means, which, in use, is incapable of detecting a pest, capable of providing at the indicating means an indication as to whether or not there is a fault in the transmission means.

The invention also provides a method of monitoring pest activity by use of the apparatus of the invention.

When the indicating means indicates that a pest has been detected, a decision can be taken as to whether a pest control operation should be carried out Since the indicating means is preferably also capable of indicating which detector means led to the indication at the indicating means that an event has taken place, a particularly accurate placement of a pest control preparation is possible. This is particularly important when large premises are being monitored.

The fact that a pest control operation, for example the placement of a preparation, need not take place until pests have been detected and can be restricted to locations where mice or other pests are known to run, constitutes a significant improvement over previously proposed methods of pest control. It will be appreciated that with appropriate apparatus and sufficient detector means it will be possible to identify preferred runways followed by the pests in the premises in which the apparatus is installed, thus facilitating even further the correct placement of a pest control preparation.

It is a further advantage of the above-described apparatus that the testing of the apparatus for a fault can take place while the apparatus is in operation. Furthermore, the use of "active" detectors can be avoided, if desired, which may make it possible to reduce costs.

It will, of course, be understood that the pest monitoring apparatus will be useful both in applications where the objective is to determine whether or not there are pests present and in applications where the objective is to obtain information on the activity of pests where they are known to be present. In situations where there are no pests present, the use of the apparatus is unlikely to attract pests since no bait is required to carry out the monitoring function. Furthermore, as bait is not required there is no danger of bait being tampered with or swallowed by humans or by animals other than the pests being monitored. Also, facilities for testing for equipment faults may be important in monitoring equipment since nil detections are less likely to be treated as being the result of equipment defects when the equipment is capable of reporting that it has a fault.

The apparatus and method of the invention are suitable for detecting pests in both large and small premises. It will be appreciated that for reliable detection over the entire premises detector means will be situated at a plurality of different locations in the premises. Where increased viligance is desirable in one particular area, for example, one particular room, a greater than average number of detector means may of course be located in that area. In very large premises it may in some cases be desirable to install more than one system according to the invention, that is to say there may be more than one indicating means, each indicating means having associated with it a plurality of detector means, but preferably there will be only one system according to the invention and thus a single indicating means for the entire premises.

Figure 2:
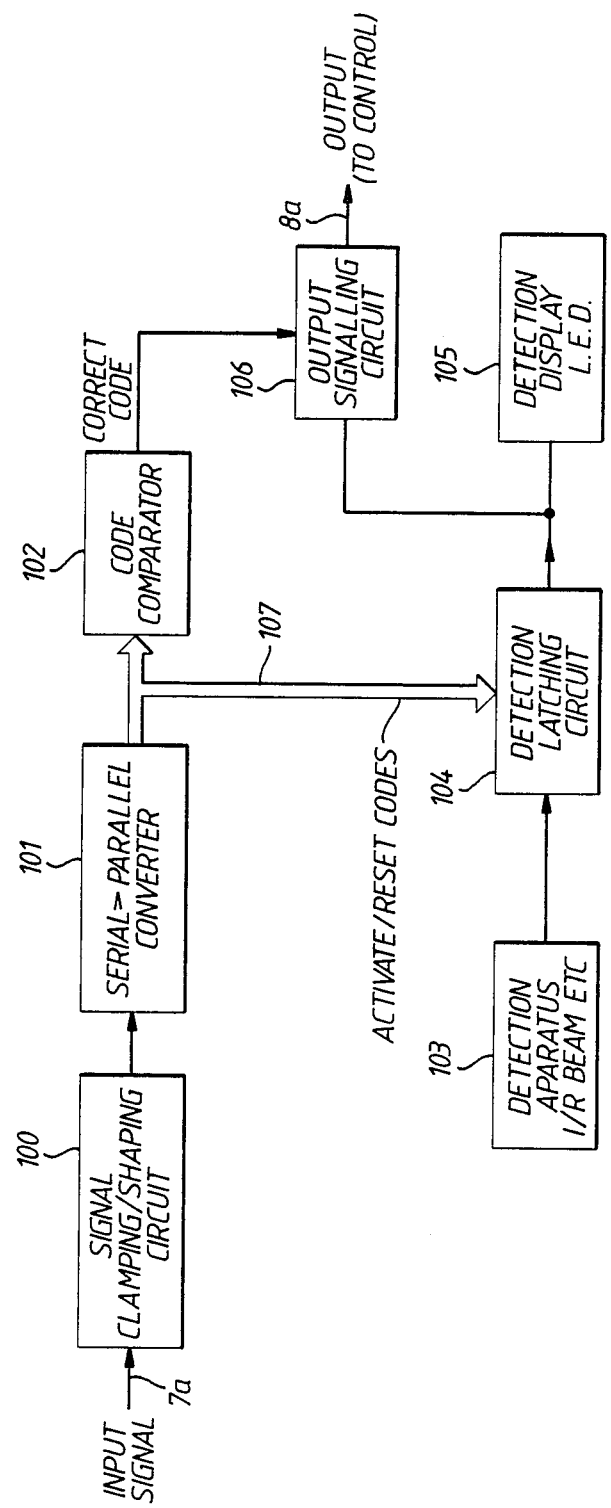
Figure 3:
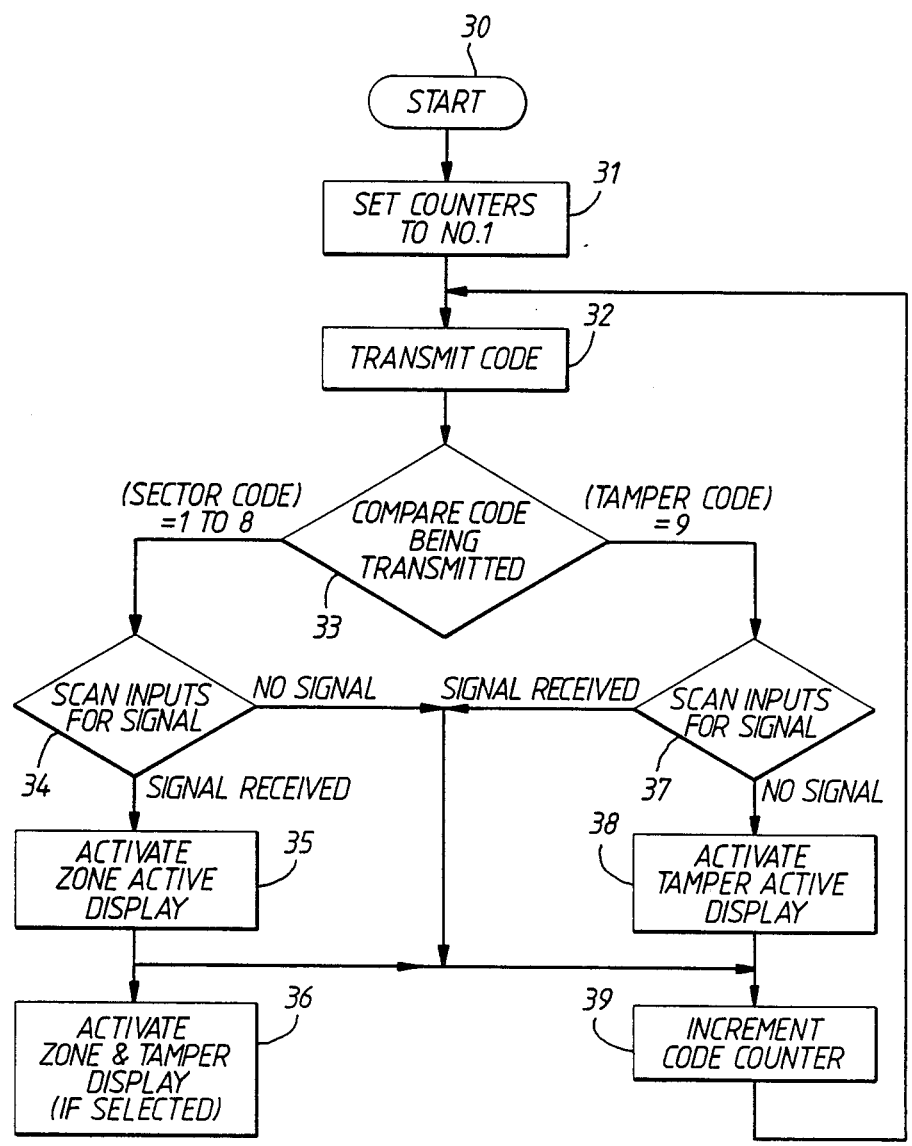
Figure 4:
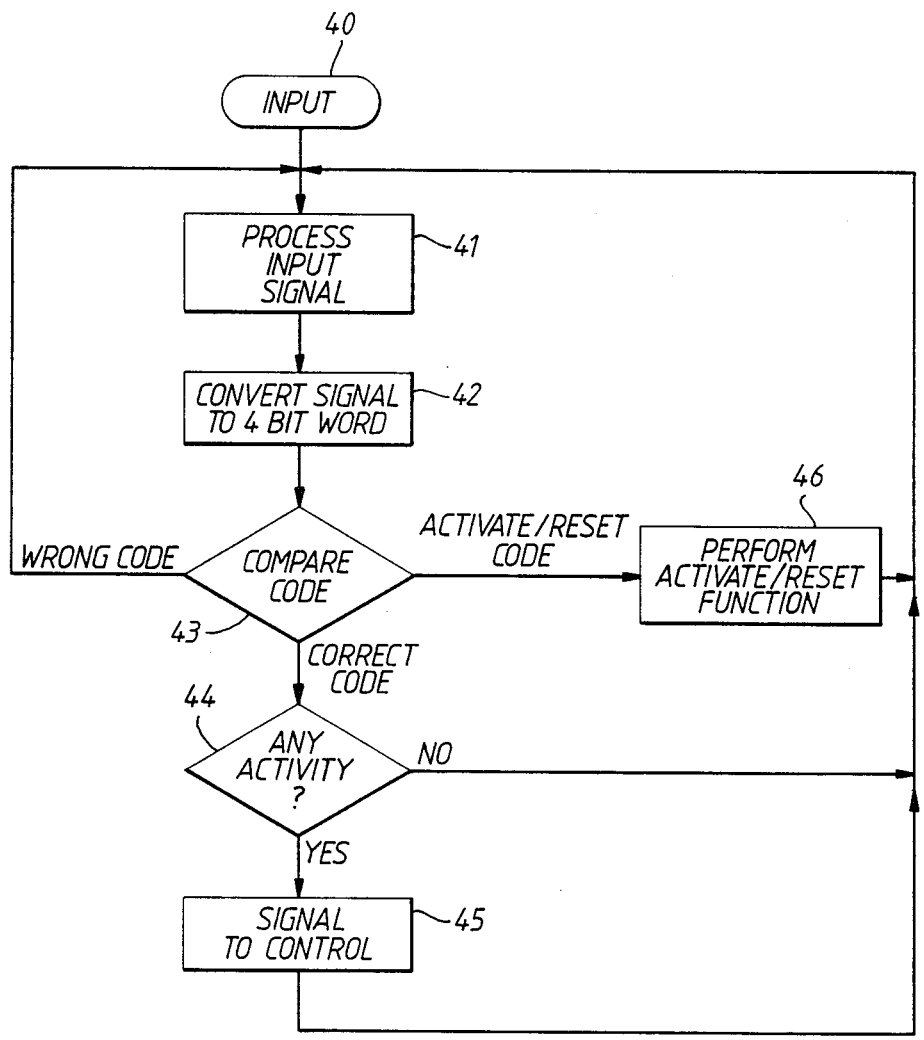
Figure 5:
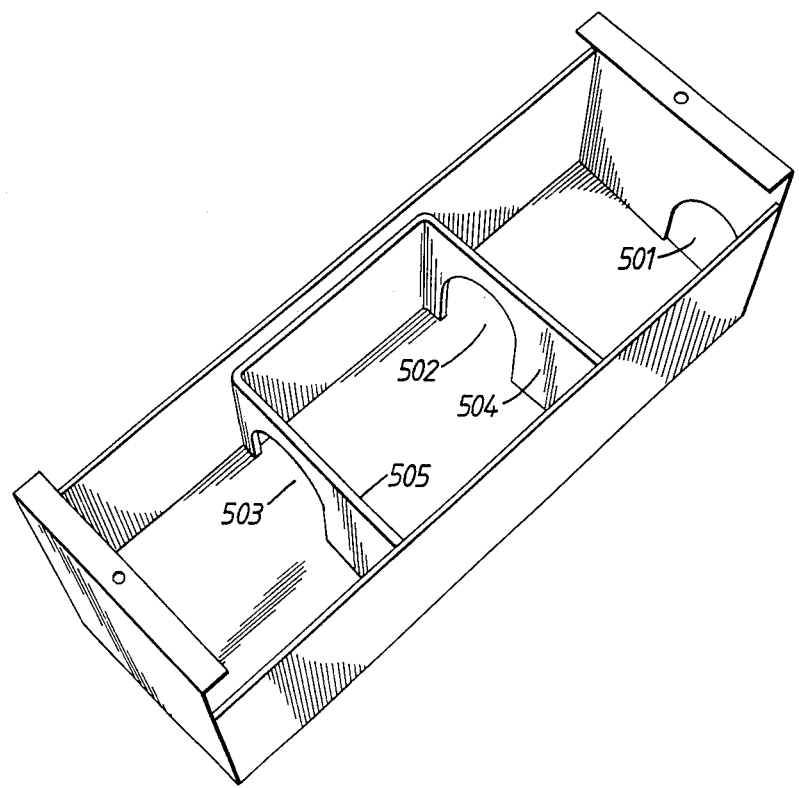

One embodiment of apparatus for monitoring pest activity, in accordance with the present invention will now be described by way of example only, and with reference to the accompanying drawings, in which:

FIG. 1 is a block schematic diagram of the apparatus for monitoring pest activity, showing a central indicator and a plurality of detectors, FIG. 2 is a block schematic diagram of one of the detectors included in the pest monitoring apparatus, FIG. 3 is a flow chart representing the operation of the central indicator of the pest monitoring apparatus, FIG. 4 is a flow chart representing the operation of one of the detectors of the pest monitoring apparatus, and, FIG. 5 is a perspective view of the interior of an enclosure of one of the detectors which is intended for use in the detection of mice.

Referring now to FIG. 1, of the drawings, the apparatus for monitoring pest activity includes a system clock 1 connected to a modulo-16 counter 2 which is connected to an input selector 3 by way of a 4-bit parallel connector 21. The system clock 1 is connected through the counter 2 to a modulo-10 counter 4 which is connected to a parallel-to-serial converter 5 by way of a 4-bit parallel connector 22 and the parallel-to-serial converter 5 is connected to an output amplifier 6. The output amplifier 6 is connected to a plurality of detectors by way of an output signal line 7 which, in practice, leaves the apparatus as a plurality of branches 7a to 7p to be routed to a plurality of zones to be monitored There are detectors 10a, 20a . . . to 80a associated with the branch 7a, and so on, up to and including detectors 10p, 20p . . . 80p associated with the branch 7p. The branch 7a has, at its end remote from the signal line 7, a responder 11a, and each branch has a respective responder, up to and including a responder 11p on the branch 7p.

Each of the branches 7a to 7p of the output signals line 7 is paired with one of a plurality of input signal line branches 8a to 8p which are also routed to the zones to be monitored. The output signal branches 8a to 8p are connected to the input selector 3 and continue within the apparatus as connectors 9a to 9p which are each terminated by one of an equal number of push switches 19a to 19p. The terminals of the push switches 19a to 19p remote from the connectors 9a to 9p are connected together and to a sector display driver 16 by way of a connector 24. The display driver 16 is connected also to the modulo-10 counter 4 by way of the 4-bit parallel connector 22. The 4-bit parallel connector 22 also connects the modulo-10 counter 4 to a code comparator 12 which is connected to a tamper active display driver 14 by way of an output connector 17 and is connected to a zone active display driver 13 by way of an output connector 18. The tamper active display driver 14 and the zone active display driver 13 are each connected also to the input selector 3 by way of a connector 23. A zone display driver 15 is also connectible to the input selector 3 by way of a first part 25a of a three-position switch 25a/25b having its three positions identified as SET, DISPLAY and TEST. The zone display driver 15 is connected also to the 4-bit parallel connector 21 and has a group of output lines 31 each connected to one of sixteen lamps 32a to 32p belonging to the push switches 19a to 19p. A second part 25b of the three-position switch 25a/25b controls the connection of a tamper display switch 27, a detector activate switch 28, and a detector reset switch 29 to the modulo-10 counter 4 by way of a connector 26, each of the switches 27,28 and 29 having also a direct connection to the modulo-10 counter 4.

The apparatus represented by FIG. 1 is in its operational mode with the three-position switch 25a/25b at its SET position at which the zone display driver 15 is disconnected from the connector 23 and the tamper display switch 27, the detector activate switch 28, and the detector reset switch 29 are disconnected from the connector 26 of the modulo-10 counter 4. When the three-position switch 25a/25b is at its DISPLAY position, the zone display driver 15 is connected to the connector 23 and any one or more of the lamps 32a to 32p will be illuminated by the zone display driver 15 according to which of the zones are active. The tamper display switch 27, the detector activate switch 28, and the detector reset switch 29 remain disconnected from the connector 26 of the modulo-10 counter. When the three-position switch 25a/25b is at its TEST position the zone display driver is connected to the connector 23, and the tamper display switch 27, the detector activate switch 28, and the detector reset switch 29, are connected to the connector 26 of the modulo-10 counter 4.

The apparatus represented by FIG. 1 is arranged to detect pests within the sensitive areas of the detectors 10a to 80a, . . . 10p to 80p, which are monitor detectors, and the detectors are arranged once triggered, to remain activated so as to provide a record of which of them has or have been activated. The apparatus is arranged also to indicate that one of the monitor detectors 10a to 80a . . . 10p to 80p has been activated, and to display, on command, data identifying activated detectors The apparatus is arranged, also, to indicate its operational condition by monitoring return signals from the responders 11a to 11p, which are located at the extremities of the branches 7a to 7p and locked in the activated condition for the system, to indicate the absence of a return signal from any one of the responders 11a to 11p, and to display, on command, data identifying a responder not providing a return signal With the three-position switch 25a/25b at its SET position, the apparatus represented by FIG. 1 operates under the control of its system clock 1 which provides timing pulses at about 2 KHz. The timing pulses drive the modulo-16 counter which generates, repeatedly, the 16-word sequence 0000,0001,0010 . . . 1111 which is received by the input selector 3. The input selector 3 responds to the receipt of the 4-bit word 0000 by connecting the input branch line 8a, say, to the output line 23, and so on, (the 4-bit word 0001 causing connection between the branch line 8b and the output line 23, the 4-bit word 0010 causing connection between the branch line 8c and the output line 23, etc.) until each of the input branch lines 8a to 8p has, in turn, been connected to the output line 23, after which the connection sequence is repeated The modulo-10 counter 4, at this time, is receiving the CARRY output digits of the 16-word sequence generated by the modulo-16 counter 2 and generates repeatedly, the 10-word sequence 0000, 0001,0010 . . . 1001 at the rate set by the CARRY output bit of the modulo-16 counter 2, of which only the last nine words 0001 to 1001 are used. The 4-bit words from the modulo-10 counter 4 are applied to the parallel-to-serial converter 5 and then to the amplifier 6 which drives the branch lines 7a to 7p by way of the connector 7, the branch lines 7a to 7p being energised with the repeating sequence 0001, 0010 . . . 1001 in serial form. Each of the detectors 10a to 10p, say, responds to the 4-bit word 0001 when it is present on the branch lines 7a to 7p by placing on the branch lines 8a to 8p an output signal when activated and no output signal when not activated. The detectors 20a to 20p respond in a similar manner to the presence of the 4-bit word 0010 on the branch lines 7a to 7p, and so on, the detectors 80a to 80p responding, as described for the detectors 10a to 10p, to the 4-bit word 1000. The responders 11a to 11p respond to the 4-bit word 1001 by providing an output signal since the responders 11a to 11p are set to the activated state for the system. The effects of the 4-bit word sequences supplied by the modulo-16 counter 2 and the modulo-10 counter 4 are that one detector at a time is connected, by way of the input selector 3, to the connector 23 at a time when its recognition code is being applied to it by way of the connector 7, and each detector, and also each of the responders 11a to 11p, is placed in this situation once for every 144 pulses generated by the system clock 1.

Referring to FIG. 1 the condition of each detector is tested, the condition of each detector being represented by the signal it provides on the connector 23 when the branch line 8a to 8p on which it lies is selected by the input selector 3 and it is interrogated by the modulo-10 counter 4, there being a nil signal from each of the detectors 10a to 10p . . . 80a to 80p when they are inactive and an activated signal from each of the responders 11a to 11p when the system is fully functional. Signals returned from the detectors along the connector 23 are applied to the zone active display driver 13, and the tamper active display driver 14. The zone active display driver 13 is disabled, by way of its connection 18 to the code comparator 12, during the periods when the modulo-10 counter 4 is generating responder words or codes and therefore does not respond to the "detector activated" signals from the responders, and similarly, the tamper active display driver 14 is disabled when non-tamper-detector words or codes are being generated by the modulo-10 counter 4 and does not respond to "detector activated" signals from the detectors 10a to 10p . . . 80a to 80p. The response of the zone active display driver 13 on being activated is to illuminate a lamp or other display devices (not shown) with instructions as to what action is required, and the response of the tamper active display driver 14 is also to illuminate an instruction as to action required by means of a lamp or other display device, which is not shown. The code comparator 12 performs the function of generating the disabling signals for the zone active display driver 13 and the tamper active display driver 14 according to which detectors are being interrogated by the modulo-10 counter 4.

The apparatus represented by FIG. 1 provides information as to its operational condition, as indicated by the returns from the responders 11a to 11p and as to the status of each of its monitoring detectors 10a to 10p . . . 80a to 80p, by operator use of the switches 19a to 19p in cooperation with the sector display driver 16, when the three-position switch 25a/25b is set to the DISPLAY position The sector display driver 16 is associated with a plurality of lamps or other display devices (not shown), there being as many display devices as there are words or codes generated by the modulo-10 counter 4, less the word or code for the responders 11a to 11p and the unused word 0000. Closure of the switch 19a will result in the signals from detectors 10a, 20a . . . 80a, and the responder 11a being routed to the connector 24 and to the sector display driver 16 which is driven by the words or codes from the modulo-10 counter to cause the energisation of a lamp or display device corresponding to each of the monitor detectors 10a, 20a, . . . 80a which has been activated. There is no lamp or display device corresponding to the responder 11a so its return is ignored. The switch 19a is then opened and the next switch is closed to give, for the next group of monitor detectors, the results corresponding to those obtained for the monitor detectors 10a , 20a, . . . 80a when the switch 19a was closed, and the procedure is repeated up to and including the closure of the switch 19p in order to provide results for the monitor detectors 10p, 20p . . . 80p. Operator use of the switches 19a to 19p and observation of the lamps or display devices driven by the sector display driver 16 therefore provide information as to the status of each of the monitor detectors 10a to 10p . . . 80a to 80p. The locations of the detectors are, of course, known from the locations of the branches 7a-8a . . . 7p-8p and the positions of the detectors along the branches 7a-8a, . . . 7p-8p.

Referring to FIG. 1., should one or more of the detectors 10a to 80a . . . 10p to 80p provide a return signal, while the apparatus is in operation (the three-position switch 25a/25b at the SET position), the zone active display driver 13 will illuminate a lamp or other display device An operator is then able to identify the zone, or zones, which are active, that is, in use, by setting the three-position switch 25a/25b to the DISPLAY position, thereby connecting the zone display driver 15 to the connector 23. The zone display driver 15 is controlled by the 4-bit words or codes from the modulo-16 counter 2 in a manner similar to that in which the input selector 3 is controlled by the modulo-16 counter 2, with the result that one of the lamps 32a to 32p will be illuminated by the zone display driver 15 for each of the branches 7a to 7p which is active, that is in use. The operator is then able to determine which of the detectors is active by operating, one at a time, each of the push switches 19a to 19p which has its lamp illuminated, as is explained above. The sector display driver 16 is able to identify the active detectors from the transmitted words or codes it receives by way of the 4-bit connector 22 and the identifying codes it receives by way of the connector 24 when any one of the push switches 19a to 19b is closed. The procedure for identifying the active detectors, of course, depends on the lamps or other display devices controlled by the sector display driver 16 being set out in the same order as the detectors, and on the operator being informed of the order.

For example, the detector 10a may have the code 0001 and correspond to the first of a line of lamps, the second detector will then have the code 0010 and correspond to the second lamp, and so on, with the eighth detector having the code 1000 and corresponding to the eighth lamp of the line of lamps.

Referring still to FIG. 1., should the central controller not receive return signals from all of the responders 11a to 11p while the apparatus is in operation (the three-position switch 25a/25p at the SET position, the tamper active display driver 14 will illuminate a lamp or other display device. An operator is then able to identify the zone or zones for which there is no response by setting the three-position switch 25a/25b to the TEST position, which permits the tamper switch 27, the detector activate switch 28, and the detector reset switch 29, to control the modulo-10 counter 4. In the instance where there is a signal not being received from a responder, the operator is required to close the tamper switch 27 which has the effect of restricting the modulo-10 counter 4 to transmitting the identifying word or code for the responders 11a to 11p, which results in the illumination of only those of the lamps 32a to 32p for which signal returns are being received from responders 11a to 11p. The information provided by the lamps 32a to 32p, when compared with a system plan, available to the operator, identifying active zones, permits the operator to identify zones with defective branches 7a to 7p or 8a to 8p. The operator is then able to locate the defect in relation to the detectors 10a to 80a ... 10p to 80p by closing the detector activate switch 28 and operating one of the switches 19a to 19p for each zone to be investigated. The effect of the detector activate switch 28 is to cause the counter 4 to transmit a word or code which, when received by the detectors 10a to 80a ... 10p to 80p, causes them to switch to their active state (the counter 4 is now, of course, providing an output word not used in the monitoring operation). The return signals from the activated detectors are routed to the sector display devices (not shown) by the closure of the switches 19a to 19p, one at a time, for the zones being investigated, and breaks in the branches 7a to 7p and 8a to 8p, and their positions relative to the detectors, will be indicated by the patterns of illuminated sector display devices to non-illuminated sector display devices.

Referring still to FIG. 1., on the completion of the investigation for defective branches 7a to 7p and 8a to 8p, the detectors are reset to their inactive state by the operation of the detector reset switch 29 with the multiposition switch 25a/25b still in the TEST position. The effect of the detector reset switch 29 is to cause the counter 4 to transmit a word or code to which the detectors respond by switching to their inactive state, this being another word not used in the monitoring operation FIG. 3 illustrates, in flow chart form the operation of the apparatus represented by FIG. 1. Referring to FIG. 1 and FIG. 3, after START (operation 30) the counters 2 and 4 are set to provide their first output words or codes (operation 31) and the codes are transmitted to the input selector 3 in one case and to the output line 7 in the other case (operation 32). The return signals on the connector 23 are examined separately by the zone active display driver 13 (operations 33 and 34) and the tamper active display driver 14 (operations 33 and 37). A "detector activated" result for the zone active display driver 1 (operation 34) results in the activation of a zone lamp or display device (operation 35) after which the counter 2 is incremented (operation 39) and the operation proceeds with the transmission of the new word or code (operation 32). Should there be no "detector activated" result sent to the zone active display driver 13 the operation proceeds directly to the incrementing of the counter 2 (operation 39) and the transmission of the new word or code (operation 32). A "detector activated" result for the tamper active display driver 14 (operation 37) results in the operation proceeding directly to the incrementing of the counter 2 (operation 39) whereas no "detector activated" result for the tamper active display driver 14 (operation 37) results in the activation of the tamper lamp or display device (operation 38) after which the operation proceeds to the incrementing of the counter 2 (operation 39) and the transmission of the new word or code (operation 32). The operation 36 represents operation with the three-position switch 25a/25b the DISPLAY and TEST positions.

Referring to FIG. 2, a monitor detector (10a, say, connected between the branch lines 7a and 8a of FIG. 1) includes a signal clamping and shaping circuit 100 connected to the branch line 7a, a serial-to-parallel converter 101 connected to the signal clamping and shaping circuit 100, a code comparator 102 connected by way of a 4-bit parallel connector 107 to the serial-to-parallel to-parallel converter 101, and an output signalling circuit 106 connected to the code comparator 102 and to the branch line 8a. The monitor detector includes also an infra-red light emitter/receiver 103 connected to a detection latching circuit 104 which is connected to a display light emitting diode 105 and is also connected to the ouput signalling circuit 106. The detection latching circuit 104 is also connected to the 4-bit parallel connector 107.

In the operation of the monitor detector of FIG. 2, serial 4-bit words or codes are received on the branch line 7a as bursts of pulses which are cleaned up and regenerated by the signal clamping and shaping circuit 100 before being passed on to the serial-to-parallel converter 101 which applies the words, in parallel format, to the code comparator 102. The code comparator 102 provides an output signal to the output signalling circuit 106 only when the current word or code matches that recognized by the code comparator 102 as the identifying code for that detector. The signal from the code comparator 102 to the output circuit 106 places the output circuit 106 in a state in which it will transmit a signal from the detection latching circuit 104 to the branch line 8a should the detection latching circuit provide a signal indicating that the beam of the infrared light emitter/receiver 103 has been interrupted at some time. The detection display light emitting diode 105 is held illuminated by the signal from the detection latching circuit 104 of an activated detector.

Referring still to FIG. 2, the detection latching circuit 104 also receives the 4-bit words or codes present on the 4-bit connector 107. The detection latching circuit 104 is arranged to be initially in a first state and to be switched to, and to maintain, a second state once there has been an interruption of the infra-red beam of the infra-red emitter/receiver 103. The detection latching circuit 104 is arranged to recognise a special "reset" word or code which may be presented to it on the 4-bit connector 107, and to respond to the "reset" word or code by assuming and maintaining its first state. The "reset" word or code is provided by the operation of the detector reset switch 29 (FIG. 1) to send the "reset"

word or code to the detectors by way of the output line 7. The "reset" facility is used to set all the monitor detectors to their inactive state ready for a period of monitoring. Similarly, an "activate" word or code is provided by the operation of the detector activate switch 28 (FIG. 1.). The monitor detector may include a magnetic-field sensor linked to the detection latching circuit 104 permitting the resetting of the detector to its inactive state by placing a magnet over the magnetic field sensor.

A responder is a modified version of the monitor detector of FIG. 2 and includes the signal clamping and shaping circuit 100, the serial-to-parallel converter 101, the code comparator 102, the output signalling circuit 106, and the detection latching circuit 104 locked in the state indicating that the detector is activated, but need not include the infra-red emitter/receiver receiver 103 and the detector display light emitting diode 105, and requires no "reset" facility.

FIG. 4 illustrates the operation of any one of the monitor detectors of FIG. 2. Referring to FIGS. 2 and 4, the arrival of a word or code at the signal clamping and shaping circuit 100 represents an input (operation 40) which is followed by the processing of the input signal pulses to restore them to their pulse form (operation 41) after which they are converted from serial to parallel format (operation 42) by the serial-to-parallel convertor 101 and checked against the detector identity code (operation 43) by the code comparator 102. Should there have been an interruption of the activated infra-red emitter/receiver 103 the detection latching circuit 104 will be in its activated state and the activity condition (operation 44) will result in a signal being sent by the output signalling circuit 106 (operation 45). If at the code comparison stage (operation 43) the code was recognized as the reset or activate code the detection latching circuit 104 will have been reset or activated (operation 46), as appropriate.

Referring to FIG. 5, an enclosure for a monitor detector for mice, as illustrated, includes a first inlet/outlet opening 501 at one end and a second inlet/outlet opening (not shown) at the other end, of the enclosure, with intermediate openings 502 and 503 of a size and shape adapted to favour the entry of a mouse or a similar small animal. The intermediate openings 502 and 503 are formed in baffles 504 and 505 and are offset from the end openings in order to make it difficult for foreign objects to be inserted to an extent to trigger the sensing device which is located in the central region between the baffles 504 and 505, supported from the cover for the enclosure. The sensing device is protected from attack by the pest while it is in the enclosure and is so positioned as to cause the presence of the pest in the central region of the enclosure to interrupt the infra-red beam provided by, for example, the infra-red emitter/receiver and detector 103 of FIG. 2. Where infra-red sensing is employed, there need be only one infra-red beam in the most basic arrangement but other configurations using more than one infra-red beam may be employed. In the enclosure represented by FIG. 5, the formations on the interior of the enclosure are such as to force a mouse or other small animal to present itself with a set orientation to the sensing device, for example, the infra-red emitter/receiver 103 of FIG. 2.

There may, of course, be more than one sensing device in each enclosure in order to improve the chances that a pest activating the detector is of a size expected of the pest being monitored. The sensing devices may be so positioned as to be sensitive to pests of height within a selected range and of width within a selected range, providing an arrangement capable of distinguishing between mice and spiders, say.

The enclosures may also be provided with shutters arranged, when triggered, to block the entrances of the enclosures and to trap a pest which has triggered the sensor, and the sensor would then be arranged to trigger the shutters which may be electrically operated. In such an arrangement the sensor would remain in the activated state once it has detected a pest.

In the installation of the monitoring apparatus of the invention, the branch lines 7a and 8a will be two conductors within a first cable routed through a first zone, and so on, the branch lines 7p and 8p being two conductors within the pth. cable routed through the pth. zone. A plurality of the detectors may have the same identity code and will be monitored at the control centre as a single detector, and such detectors will be grouped together physically. Other variations will be evident to a person skilled in the art of electrical surveillance.

We claim:

1. Apparatus for monitoring the activity of pests, including a plurality of detector means distributed over an area under surveillance, an indicating means for indicating whether or not a pest has been detected by any of the detector means and being capable of sending a signal to each detector means, the indicating means and each detector means being linked by transmission means, each detector means being capable of providing information to the indicating means as to whether or not a pest has been detected only on receipt of a signal from the indicating means, and, when the apparatus is in use for monitoring, responding to a said signal or making no response to the signal to indicate to the indicating means whether or not a pest has been detected by that detector means, and testing means capable of providing at the indicating means an indication as to whether or not there is a fault in the transmission means.

2. Apparatus as claimed in claim 1, wherein each detector means, when the apparatus is in use for monitoring, responds to a said signal from the indicating means when a pest has been detected by that detector means and makes no response when no pest has been detected.

3. Apparatus as claimed in claim 2, wherein the indicating means is capable of sending a setting signal to each detector means to place each detector means in an activated state, the setting signal not being sent when the apparatus is in use for monitoring, each detector means responds to the indicating means in the event of receiving the setting signal, and the indicating means is capable of indicating from which of the detector means a response is received when the indicating means send the setting signal.

4. Apparatus as claimed in claim 3, wherein each detector means includes a display means for indicating when it is in the activated state.

5. Apparatus as claimed in claim 1, wherein, when the apparatus is in use for monitoring, the testing means normally sends signals to the indicating means, the failure of the indicating means to receive signals from the testing means being indicated as a fault.

6. Apparatus as claimed in claim 5, wherein the testing means sends a signal to the indicating means only on the receipt by the testing means of a specific signal from the indicating means.

7. Apparatus as claimed in claim 5, which includes at least one additional testing means and, if a fault is indicated, the indicating means is capable indicating from which testing means no signals have been received.

8. Apparatus as claimed claim 7, wherein each testing means occupies a position along the transmission means that is remote from the indicating means, and the detector means occupy positions between a testing means and the indicating means.

9. Apparatus as claimed in claim 8, wherein each testing means, when the apparatus is in use for monitoring, is incapable of detecting a pest.

10. Apparatus as claimed in claim 1, capable of retaining information as to which of the detector means has or have detected a pest.

11. Apparatus as claimed in claim 10, capable of retaining, for each detector means, only the information that a pest has been detected.

12. Apparatus as claimed in claim 10, capable of retaining, for each detector means, information additional to the information that a pest has been detected.

13. Apparatus as claimed claim 10, wherein all of the information retained by the apparatus is retained by the respective detector means.

14. Apparatus as claimed in claim 1, in which each detector means comprises a sensing device housed in an enclosure that is so contoured internally as to favour the entry of pests conforming to selected physical characteristics of the pests which are the target of the monitoring.

15. Apparatus as claimed in claim 14, wherein each enclosure is so contoured internally as to cause a pest moving in the enclosure to move into the detection field of the sensing device.

16. Apparatus as claimed claim 14, wherein each detector means comprises a plurality of sensing devices housed in an enclosure, the sensing devices being so positioned in the enclosure as to favour the detection of pests of sizes only within a selected range characteristic of the pests which are the target of the monitoring.

17. Apparatus as claimed in claim 16, wherein each detector means includes a first line-of-sight sensing device capable of detecting pests only of heights within a selected range, and a second line-of-sight sensing device capable of detecting pests only of widths within a selected range, the selected ranges being characteristic of the pests which are the target of the monitoring.

18. Apparatus as claimed claim 16, wherein each enclosure is so contoured internally as to cause a pest to pass with a specific orientation within the detection field of the, or each, sensing device.

19. Apparatus for monitoring the activity of pests, including:

a plurality of detector means distributed over an area under surveillance, each detector means being capable of providing information to an indicating means as to whether or not a pest has been detected only on receipt of a signal from the indicating means, and, when the apparatus is in use for monitoring, responding to a said signal or making no response to indicate to the indicating means whether or not a pest has been detected, an indicating means for indicating whether or not a pest has been detected by any one of a plurality of detector means with which it is linked and being capable of sending a signal to each detector means with which it is linked, a transmission means linking the indicating means with each detector means and providing for the exchange of signals, and testing means which, in use, is incapable of detecting a pest, capable of providing at the indicating means an indication as to whether or not there is a fault in the transmission means.

* * * * *

UNITED STATES PATENT AND TRADEMARK OFFICE
CERTIFICATE OF CORRECTION

PATENT NO. : 4,862,145

DATED : August 29, 1989

INVENTOR(S) : Adrian Patrick Meehan et al.

It is certified that error appears in the above-identified patent and that said Letters Patent is hereby corrected as shown below:

Col. 3, line 50 after "detected" insert a period.

Col. 4, line 16 after "hole" insert a period.

Col. 4, line 20 after "detect" insert a period

Col. 4, line 63 "pest" should be --pests--.

Col. 4, line 64 after "tored" insert a period.

Col. 5, line 1 after "detected" insert a period.

Col. 5, line 3 after "premises" insert a period.

Col. 5, line 29 after "device" insert a period.

UNITED STATES PATENT AND TRADEMARK OFFICE
CERTIFICATE OF CORRECTION

PATENT NO. : 4,862,145

DATED : August 29, 1989

INVENTOR(S) : Adrian Patrick Meehan et al.

It is certified that error appears in the above-identified patent and that said Letters Patent is hereby corrected as shown below:

Col. 5, line 59 after "forms" insert a period.

Col. 7, line 48 after "monitored" insert a period.

Col. 8, line 52 after "tors" insert a period.

Col. 8, line 59 after "signal" insert a period.

Col. 9, line 7 after "repeated" insert a period.

Col. 10, line 45 after "device" insert a period.

Col. 11, line 55 after "tion" insert a period.

Col. 11, line 67 "1" should be --13--.

Col. 12, line 27 delete "to-parallel".

UNITED STATES PATENT AND TRADEMARK OFFICE
CERTIFICATE OF CORRECTION

PATENT NO. : 4,862,145

DATED : August 29, 1989

INVENTOR(S) : Adrian Patrick Meehan et al.

It is certified that error appears in the above-identified patent and that said Letters Patent is hereby corrected as shown below:

Col. 15, line 3 after "capable" insert --of--.

Col. 15, lines 5, 22, 25 and 35 after "claimed" insert --in--.

Col. 16, line 10 after "claimed" insert --in--.

Signed and Sealed this

Sixth Day of November, 1990

Attest:

HARRY F. MANBECK, JR.

Attesting Officer

Commissioner of Patents and Trademarks